(12) United States Patent
Ramirez

(10) Patent No.: US 7,434,085 B2
(45) Date of Patent: Oct. 7, 2008

(54) ARCHITECTURE FOR HIGH AVAILABILITY USING SYSTEM MANAGEMENT MODE DRIVEN MONITORING AND COMMUNICATIONS

(75) Inventor: Nick Ramirez, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/240,237

(22) Filed: Sep. 29, 2005

(65) Prior Publication Data

US 2006/0031706 A1 Feb. 9, 2006

Related U.S. Application Data

(62) Division of application No. 10/056,949, filed on Jan. 24, 2002, now abandoned.

(51) Int. Cl.
*G06F 11/00* (2006.01)
(52) U.S. Cl. .............................. 714/1; 714/15
(58) Field of Classification Search .................. 714/15, 714/21–24, 1, 47
See application file for complete search history.

(56) References Cited

U.S. PATENT DOCUMENTS

| | | | | |
|---|---|---|---|---|
| 5,519,870 A | * | 5/1996 | Kannan et al. | 713/2 |
| 5,745,770 A | * | 4/1998 | Thangadurai et al. | 710/260 |
| 6,049,672 A | * | 4/2000 | Shiell et al. | 717/168 |
| 6,205,560 B1 | * | 3/2001 | Hervin et al. | 714/34 |
| 6,314,532 B1 | * | 11/2001 | Daudelin et al. | 714/38 |
| 6,480,944 B2 | * | 11/2002 | Bradshaw et al. | 711/162 |
| 6,658,590 B1 | * | 12/2003 | Sicola et al. | 714/6 |
| 6,697,960 B1 | * | 2/2004 | Clark et al. | 714/15 |
| 6,820,216 B2 | * | 11/2004 | Cmelik et al. | 714/15 |
| 6,920,580 B1 | * | 7/2005 | Cramer et al. | 714/4 |
| 7,111,189 B1 | * | 9/2006 | Sicola et al. | 714/6 |
| 2001/0037475 A1 | * | 11/2001 | Bradshaw et al. | 714/15 |
| 2002/0188763 A1 | * | 12/2002 | Griffin | 709/310 |

* cited by examiner

*Primary Examiner*—Dieu-Minh Le
(74) *Attorney, Agent, or Firm*—Caven & Aghevli, LLC

(57) ABSTRACT

A computer system and method for providing high availability. The computer system includes an application level, an operating system level supporting the application level, and a firmware level supporting the operating system level. The firmware level includes a microprocessor having a system management mode that functions independently from the operating system level. The system management mode is configurable to execute system management code to monitor each of the levels of the computer system and to correct malfunctions in the levels in response to a system management interrupt.

14 Claims, 4 Drawing Sheets

ARCHITECTURE FOR HIGH AVAILABILITY USING SYSTEM MANAGEMENT MODE DRIVEN MONITORING AND COMMUNICATIONS

CROSS REFERENCE TO RELATED APPLICATION

The present application is a divisional of and claims priority to application Ser. No. 10/056,949, filed Jan. 24, 2002 now abandoned.

FIELD OF THE INVENTION

The present invention relates to microprocessor systems and more particularly, but without limitation, relates to using System Management Mode (SMM) and System Management Interrupt (SMI) capabilities of a microprocessor to detect errors, execute instructions and provide fault tolerance and high availability for computer systems.

BACKGROUND INFORMATION

Computer systems based upon the Intel x86 family of microprocessors can employ several different microprocessor modes. Each mode has a defined boundary in terms of memory addresses for program code and data that is configured by the firmware of the microprocessor. A number of the microprocessor modes are "protected" modes in the sense that they operate independently from and are generally unaffected by the operating system that functions over of the microprocessor modes. The microprocessor can execute instructions in several protected modes simultaneously without risk of violating the independent operations of each mode.

In Intel microprocessors, the System Management Mode (SMM) is a protected mode that is designed to have complete authority over the microprocessor. For example, the SMM provides full access to certain I/O functions of the BIOS (basic input/output system), and system management code can be used to control hardware and firmware features independently from the operating system and application software. Additionally, the SMM can be used to store information about the system configuration of a frozen or powered-down device because its operation does not depend upon the correct functioning of the higher-level operating system, application code or device drivers.

DETAILED DESCRIPTION

In accordance with the present invention, the SMM of one or more microprocessors is used to provide a fault-tolerant, high availability system. When errors are detected, a SMM code executes prescribed plans of action from policy handling code. Such prescribed plans of action may include saving critical state information upon detection, which information can be used to speed up resetting of a computer system after a malfunction, and to determine the cause of the error or malfunction. The SMM functions operate independently from the operating system.

Figure 1:
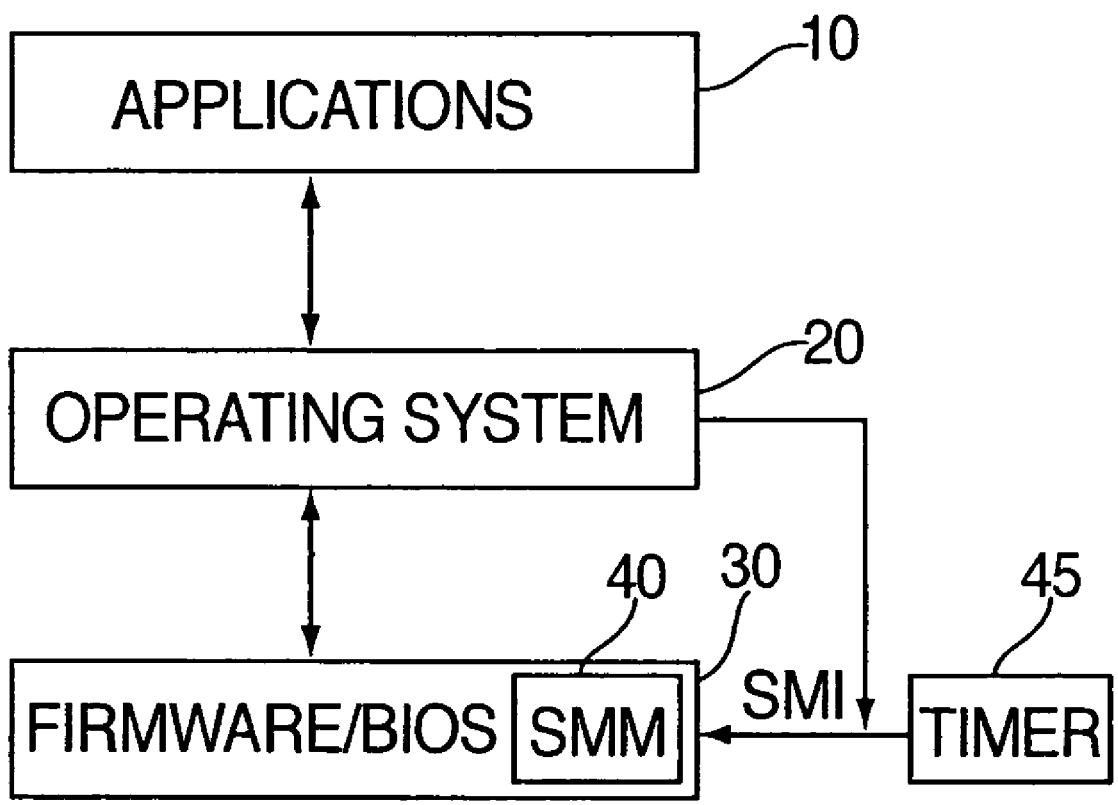
FIG. 1 is a schematic block diagram of architecture levels of a computer system including a SMM according to an embodiment of the present invention.

FIG. 1 is a schematic representation of the architecture of a computer system according to the present invention. According to the figure, applications programs 10 such as, for example, a word processing program, function over the operating system 20 in that the program code of the applications interact with functions and procedures of the operating system rather than directly with the firmware and hardware of the computer system. The operating system 20, in turn, operates over the firmware and BIOS 30 that is embodied in the microprocessor and various other application specific integrated circuits (ASICs) in the computer system 5. The firmware layer 30 includes firmware code and memory space 40 allocated for function of the SMM. The SMM code stored at 40 may contain various monitoring, data loading, and resetting procedures, among others prescribed operations. The various procedures of the code do not run continuously, but rather, they are triggered by a System Management Interrupt (SMI) which is delivered to the SMM code after the expiration of a timer 45 or after the occurrence of an external event or an occurrence in the operating system 20 or application 30 levels.

Figure 2:
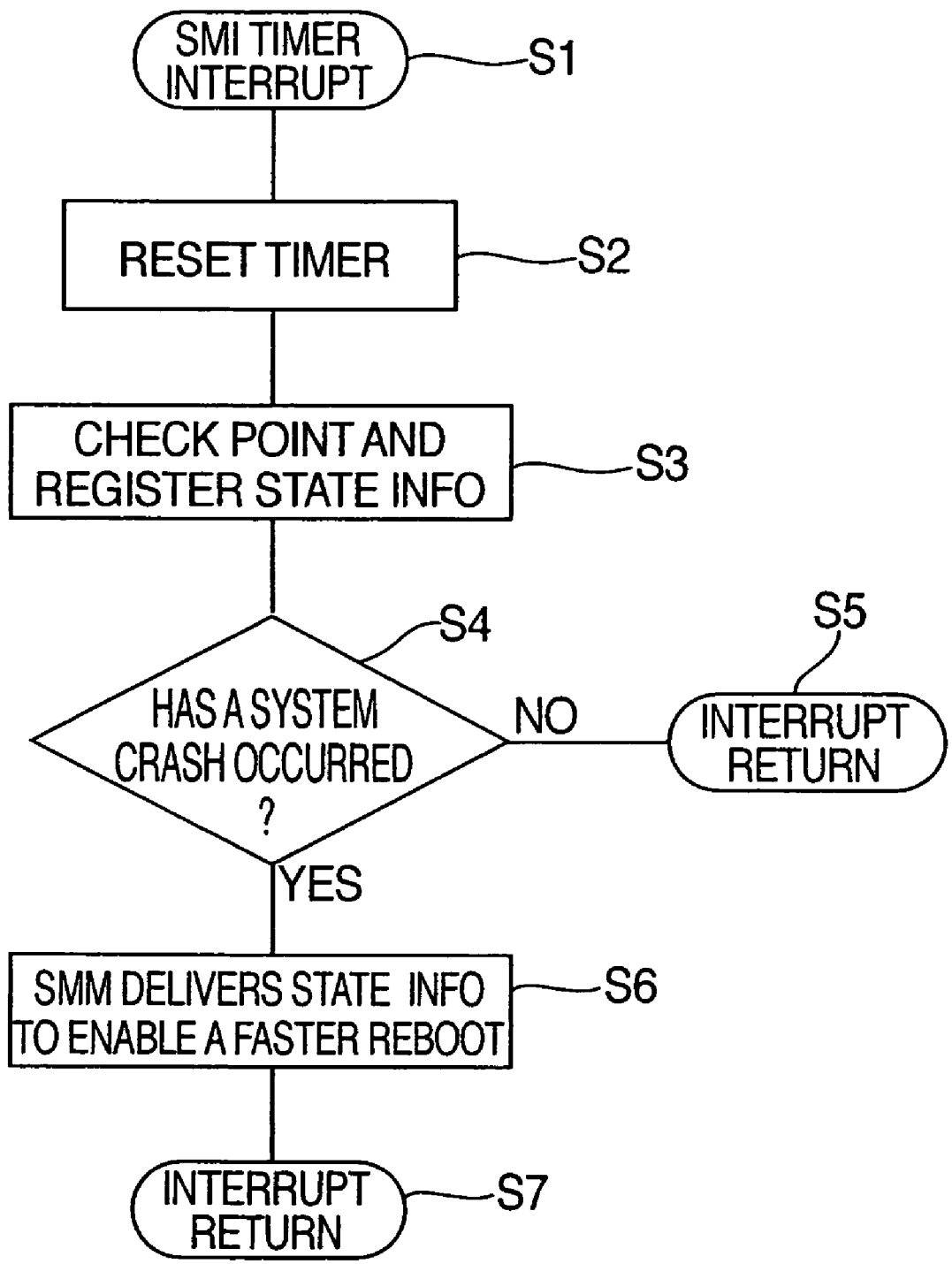
FIG. 2 is a flow chart of a method for promoting a faster recovery after a system malfunction according to an embodiment of the present invention.

The SMM can be used to promote a faster recovery after operating system malfunctions according to the following method illustrated as a flow chart in FIG. 2. In step S1, a SMI-triggering timer elapses. In step S2, after elapse of the timer, SMM code on a resident or networked microprocessor resets the timer. In step S3, the SMM code then check points and registers (identifies) all application software, drivers, the operating system and I/O devices as a background task. Since the background checks are based upon a timer, any changes in this information over time is also registered. It is noted that the timer can be set to a very small time period, such as 1 millisecond, so that the monitoring occurs approximately continuously for all practical purposes. The timer can also be set to longer intervals so as not to affect system application software performance. In step S4, the SMM independently monitors whether the operating system has crashed due to hardware or driver malfunction. If no crash has occurred, the method performs and interrupt return in step S5, but if a crash has occurred, in S6, SMM code releases the state information it has stored to other system management controls which control rebooting of the computer system. This is followed by an interrupt return in S7. If a two-stage time is used for SMI/reset, the timer is then allowed to run out and cause a microprocessor reset.

Having state information about the drivers, I/O, memory, and interrupts just prior to the crash enables a faster and more "stateful" rebooting and recovery because the system controls can more directly replicate the last known functional state of the computer system prior to the malfunction. Additionally, the state information can also be used to determine any sources of operating system malfunction after a crash. This determination can also enable faster recovery by attributing the cause of malfunction between hardware, software and external causes. System management code can then determine whether a reboot or a hardware exchange is more appropriate for system recovery. Furthermore, SMI interrupts can initiate SMM policy handling software in response to errors as they occur. For example, SMM software can be used to close files or send messages to alert both applications and the operating system to perform emergency shut down procedures before disconnection or power loss.

Figure 3:
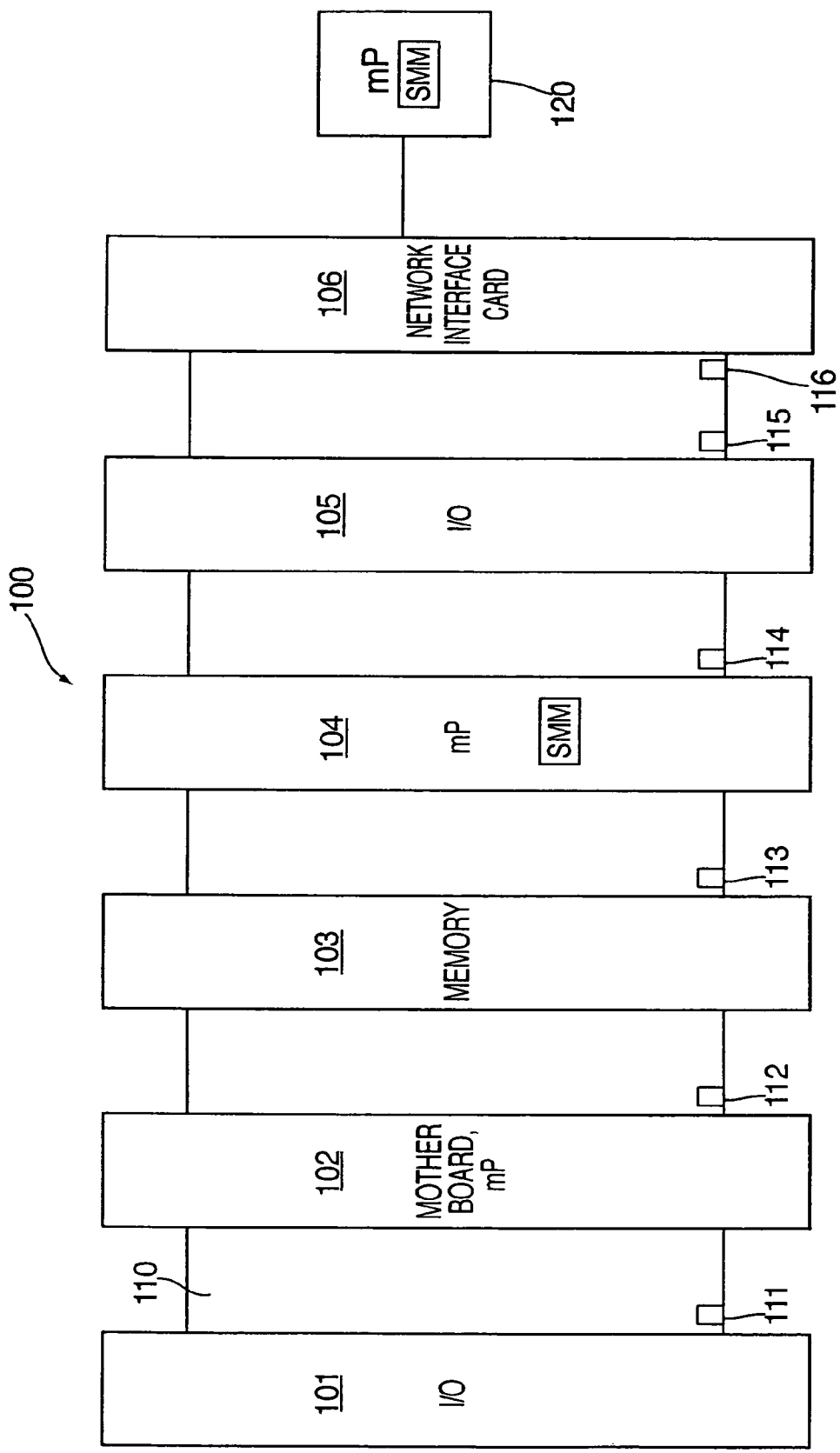
FIG. 3 is a schematic block diagram of a hardware rack assembly including SMM code according to an embodiment of the present invention.

FIG. 3 schematically illustrates a rack computer system 100 in which SMI and SMM policy handling code are used to detect "hot swaps" and to direct emergency shut down operations. Hot swaps denote the removal and replacement of a component in a computer system while the system is running. As shown in FIG. 3, computer system 100 comprises a rack of cards 101-106 connected by a bus 110. Each of the cards provides functionality to the rack computer system as a whole and may include redundant capability. Although only six cards are shown, the number is merely exemplary, and any number of cards can be coupled to the rack computer system. Cards 101, 105 are I/O cards, card 102 is a motherboard including a microprocessor (mP), card 103 is a memory card and 106 is a network interface card. Card 104 includes a microprocessor that stores SMM policy handling code according to the present invention. Alternatively, each card can include a microprocessor having SMM capability, or the SMM code may be stored separately from the cards in a microprocessor 120 coupled to the rack computer system 100.

Each of the cards 101-106 is releasable from the rack computer system via respective switches 111-116. If, for example, switch 111 is activated to release I/O card 101, a SMI is automatically generated by the I/O card and passed on the SMM code at card 104 or at microprocessor 120. The SMM code then executes instructions to save configured states of the card 101 being removed in SMRAM (system management random access memory) allocated for such purposes, and shuts off power delivery to the card. When a replacement board is inserted into the same slot, or if there is a separate card in another slot that is on stand-by, the SMM code detects the insertion or the stand-by condition, and then downloads the state information from memory to the card, thus providing a smooth transition for swapped or exchanged cards to maintain the availability of the cards for continued use. In this manner, the SMM monitors the computer system 5 so that there is a mechanism to transfer functionality of various components so that the system as a whole remains active at all times.

Figure 4:
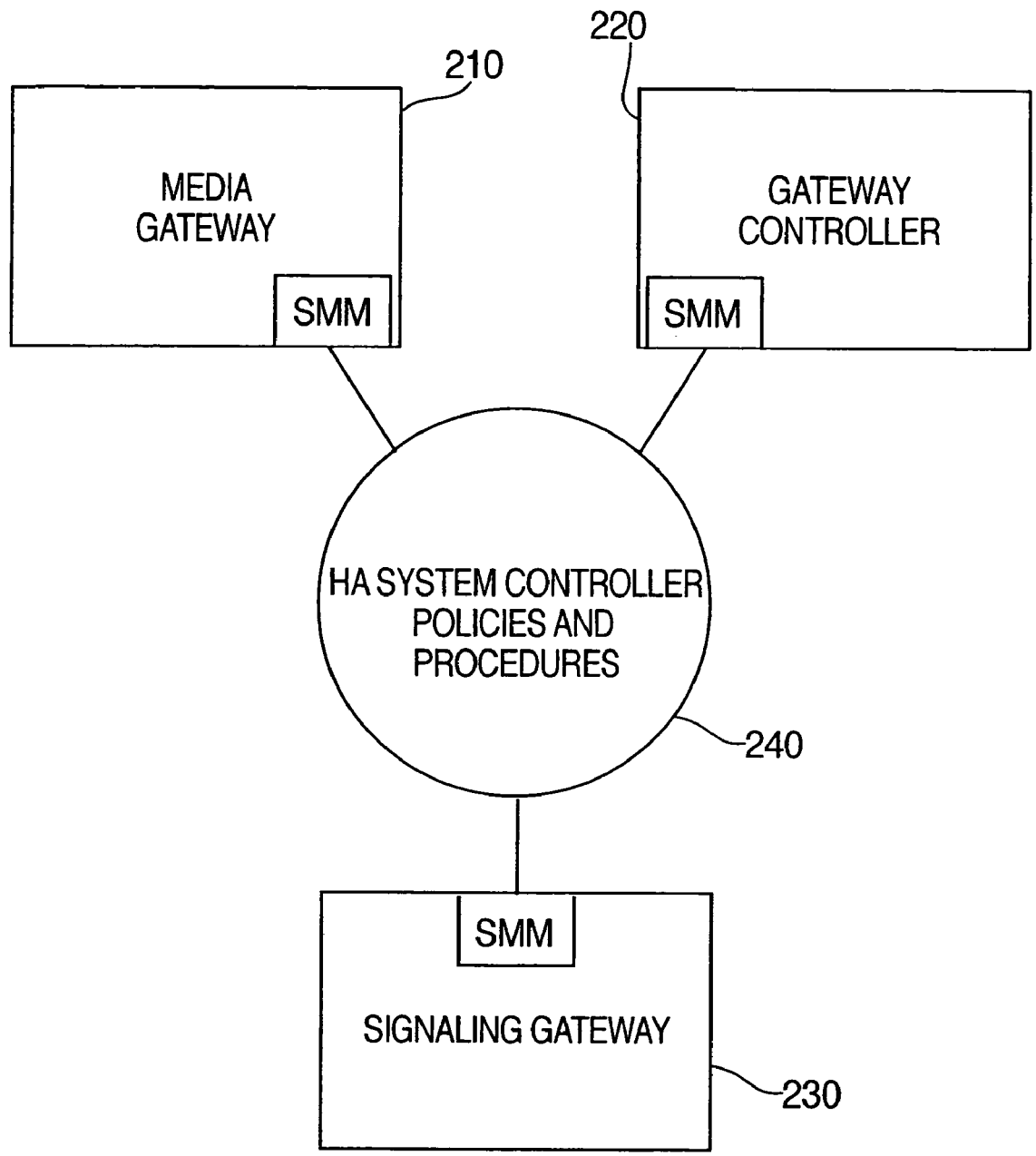
FIG. 4 is a schematic block diagram of a high availability telecommunication system employing SMM policy and procedure code according to the present invention.

An architecture applying SMM driven monitoring and communications can be readily applicable to a telecommunications infrastructure to provide fault tolerance and high availability. A high-level schematic illustration of a telecommunications system employing SMM monitoring and communications according to the present invention is shown in FIG. 4. FIG. 4 shows a voice-over Internet Protocol (VoIP) infrastructure 200 that includes a media gateway 210, a signaling gateway 220 and a gateway controller 230. All of these components are coupled to one another, and in addition, each is coupled to a high availability system controller 240. The media gateway 210 performs the function of translating between continuous PCM voice data traffic to or from a regular POTS (plain old telephone system) network from and packetized data to or from an IP-based network. Similarly, the signaling gateway 220 converts between SS7 signaling messages of a POTS network and IP or H.323 based signaling messages of an IP network. The gateway controller 230 receives the converted signaling messages from the signaling gateway 220 and translates telephone number information into an IP address and then arranges routing of the media traffic from the media gateway 210 according to the IP address. Each of the media gateway 210, signaling gateway 220, and gateway controller 230, includes an Intel x86 microprocessor having a SMM.

In this VoIP telephone system, it is vital to have each of the gateway and controller components 210, 220, 230 running at all time to prevent loss of communication, in part because this system does not necessarily have the redundant capacity of the POTS networks. Therefore, high availability of these components is a necessity to provide quality of service comparable to the regular voice networks. The embedded SMM of the telecom components 210, 220, 230 can be used to perform near-continuous monitoring for faults, and to save state information. When a malfunction is detected at any of the telecom components 210, 220, 230 an SMI is generated and the SMM code sends a message including state information to a high availability controller 240 which stores policy and procedure code. Upon receiving the SMI, the high availability controller transmits instructions to one or more of the processors at the components. While the high availability controller 240 is depicted as a separate component, the control code to implement high availability may be co-located in one or more of the processors within the telecom components 210, 220, 230 in addition to, or instead of, the separate controller 240.

As described above, the high availability controller 240 may execute code to determine the cause of the malfunction, power-down various devices; activate replacement devices (not shown) to cover for any malfunctioning devices; and re-route traffic to maintain the quality of service of the network. The policy and procedures initiated by the high availability system controller 240 can be also include more detailed and complex instructions, such as specific instructions to the signaling gateway regarding sending certain types of requests for re-sending or momentary delaying of messages during a malfunction. Since the monitoring and correction functions of the SMM and high availability controller operate in a protected mode independently from higher level software operating systems such as gateway translation software, H.323 messaging software, and any base operating system, such as UNIX, Linux, or Microsoft Windows™, hardware fault tolerance can be safeguarded independently regardless of the function of the higher level software components.

In the foregoing description, the system and method of the invention have been described with reference to a number of examples that are not to be considered limiting. Rather, it is to be understood and expected that variations in the principles of the system and method herein disclosed may be made by one skilled in the art, and it is intended that such modifications, changes, and/or substitutions are to be included within the scope of the present invention as set forth in the appended claims.

What is claimed is:

1. A computer system comprising:
an application level;
an operating system level supporting the application level; and
a firmware level supporting the operating system level, the firmware level including a microprocessor having a system management mode that functions independently from the operating system level, the system management mode to execute system management code to save state information, monitor each of the levels of the computer system and to use the saved state information to determine corrective actions based on detected malfunctions in the levels.

2. The computer system of claim 1, wherein the system management mode to execute system management code comprises the system management mode to execute the system management code based on receipt of a system management interrupt.

3. The computer system of claim 1, further comprising:
a timer coupled to the firmware level and set for a duration, wherein the timer triggers transmission of a system management interrupt after the duration has elapsed.

4. The computer system of claim 1, wherein the system management code stores state information concerning the application, the operating system and the firmware levels based on receipt of the system level interrupt.

5. The computer system of claim 2, wherein the system management interrupt is triggered by a malfunction in at least one selected from the following group of: the application level, operating system level, and firmware level.

6. The computer system of claim 5, wherein the system management code initiates a stateful rebooting of the computer using the saved information concerning the application, the operating system and the firmware levels.

7. The computer system of claim 5, wherein the system management code includes a diagnostic routine to determine the source of the malfunction.

8. The computer system of claim 1, wherein the computer system includes a rack computer system and the microprocessor having a system management mode is resident on a card to be inserted in the rack computer system.

9. A method for providing a stateful resetting of a computer system including a microprocessor that has a system management mode that functions independently of an operating system, the method comprising:
storing state information concerning a state of the computer system according to code executed in the system management mode on a regular basis;
detecting a malfunction in the computer system; and
triggering the system management mode to execute code to deliver the stored state information to restore the state of the computer system prior to the detected malfunction.

10. The method of claim 9, wherein the regular basis is based on:
setting a timer;
sending a system management interrupt after elapsing of the timer;
resetting the timer; and
storing the state information based on receipt of the system management interrupt.

11. The method of claim 9, wherein the computer system includes a rack computer system and the microprocessor that has a system management mode is resident on a card to be inserted in the rack computer system.

12. A method implemented by a microprocessor in a rack computer system including a plurality of cards coupled to the rack computer system, the microprocessor to include a system management mode that executes code to monitor a state of the plurality of cards, the method comprising:
detecting initiation of a removal of a card from the rack computer system;
storing the card's state information according to code executed in the system management mode;
shutting off power to the card; and
delivering the card's state information to another card to provide the functions of the card to the rack computer system.

13. The method of claim 12, wherein the other card comprises one of a replacement card coupled to the rack computer system to replace the card or a stand-by card coupled to the rack computer system to be used as a substitute for the card.

14. The method of claim 12, wherein storing the card's state information comprises storing the card's state information in a system management random access memory.

* * * * *